(12) United States Patent
Cobzaru

(10) Patent No.: US 10,974,310 B2
(45) Date of Patent: Apr. 13, 2021

(54) AUTOMATIC DOUBLE-ACTION FASTENER INSTALLATION TOOL

(71) Applicant: SPS Technologies, LLC, Jenkintown, PA (US)

(72) Inventor: Cristinel Cobzaru, Murrieta, CA (US)

(73) Assignee: SPS Technologies, LLC, Jenkintown, PA (US)

(*) Notice: Subject to any disclaimer, the term of this patent is extended or adjusted under 35 U.S.C. 154(b) by 148 days.

(21) Appl. No.: 16/203,535

(22) Filed: Nov. 28, 2018

(65) Prior Publication Data

US 2019/0160520 A1    May 30, 2019

Related U.S. Application Data

(60) Provisional application No. 62/591,617, filed on Nov. 28, 2017.

(51) Int. Cl.
| | |
|---|---|
| *B23P 19/04* | (2006.01) |
| *B21J 15/10* | (2006.01) |
| *F16B 19/10* | (2006.01) |
| *B21J 15/18* | (2006.01) |
| *B21J 15/04* | (2006.01) |

(Continued)

(52) U.S. Cl.
CPC .......... *B21J 15/105* (2013.01); *B21J 15/043* (2013.01); *B21J 15/045* (2013.01); *B21J 15/12* (2013.01); *B21J 15/142* (2013.01); *B21J 15/18* (2013.01); *B25B 27/0014* (2013.01); *F16B 19/1063* (2013.01); *F16B 19/1072* (2013.01); *F16B 19/1054* (2013.01)

(58) Field of Classification Search
CPC ........ B21J 15/105; B21J 15/18; B21J 15/043; F16B 19/072

USPC ...... 29/246.53, 243.522, 524.1, 525.02, 504; 81/55

See application file for complete search history.

(56) References Cited

U.S. PATENT DOCUMENTS

| | | | |
|---|---|---|---|
| 2,415,560 A | 2/1947 | Higley | |
| 2,789,597 A * | 4/1957 | La Torre | B25B 27/0014 |
| | | | 81/55 |

(Continued)

FOREIGN PATENT DOCUMENTS

| | | |
|---|---|---|
| DE | 2744547 | 4/1979 |
| EP | 1690631 | 8/2006 |

(Continued)

OTHER PUBLICATIONS

International Search Report for International Application PCT/US2018/062921, dated Mar. 26, 2019.

(Continued)

*Primary Examiner* — Joseph J Hail
*Assistant Examiner* — Shantese L McDonald
(74) *Attorney, Agent, or Firm* — Burris Law, PLLC

(57) ABSTRACT

A tool for installing a blind fastener including a core bolt and a core nut is provided. The tool includes a driving member, a collet driven by the driving member for engaging the core bolt, and an external sleeve for holding the core nut and preventing the core nut from rotating during installation of the blind fastener. The external sleeve is movable between a first position in which the external sleeve is driven by the collet to rotate with the collet and a second position in which the external sleeve is stationary despite rotating action of the collet.

20 Claims, 18 Drawing Sheets

(51) Int. Cl.
B25B 27/00 (2006.01)
B21J 15/14 (2006.01)
B21J 15/12 (2006.01)

(56) References Cited

U.S. PATENT DOCUMENTS

| | | | |
|---|---|---|---|
| 2,863,351 A | 12/1958 | Vaughn | |
| 3,253,495 A | 5/1966 | Orloff | |
| 3,357,094 A * | 12/1967 | Mouck | F16B 19/1063 29/509 |
| 4,000,668 A * | 1/1977 | Keasler | B25B 27/0014 81/55 |
| 4,211,145 A | 7/1980 | Dolch | |
| 4,630,510 A * | 12/1986 | Belanger | B23P 19/06 29/243.519 |
| 6,761,520 B1 | 7/2004 | Dise | |
| 6,868,757 B2 | 3/2005 | Hufnagl et al. | |
| 7,438,773 B2 | 10/2008 | Denham et al. | |
| 7,857,563 B2 | 12/2010 | Pratt | |
| 8,979,453 B2 | 3/2015 | Hufnagl et al. | |
| 9,593,706 B2 | 3/2017 | Bickford et al. | |
| 2008/0025811 A1 | 1/2008 | Auriol et al. | |
| 2011/0123289 A1 | 5/2011 | Pratt | |
| 2012/0263556 A1 | 10/2012 | Pratt | |
| 2013/0061451 A1 | 3/2013 | Pratt | |
| 2013/0061452 A1 | 3/2013 | Pratt | |
| 2014/0201974 A1 | 7/2014 | Mitchell | |
| 2015/0010370 A1 | 1/2015 | Pratt | |
| 2015/0196951 A1 | 7/2015 | Bigot et al. | |
| 2017/0146045 A1 | 5/2017 | Bickford et al. | |

FOREIGN PATENT DOCUMENTS

| | | |
|---|---|---|
| EP | 2647851 | 10/2013 |
| EP | 3009695 | 4/2016 |
| EP | 2839172 | 8/2017 |
| FR | 3037369 | 7/2017 |
| FR | 3053745 | 1/2018 |
| GB | 2163823 | 3/1986 |
| GB | 2383107 | 6/2003 |
| WO | 2018007324 | 1/2018 |

OTHER PUBLICATIONS

International Search Report for International Application PCT/US2018/062653, dated Mar. 11, 2019.

International Search Report for International Application PCT/US2018/062658, dated Mar. 11, 2019.

* cited by examiner

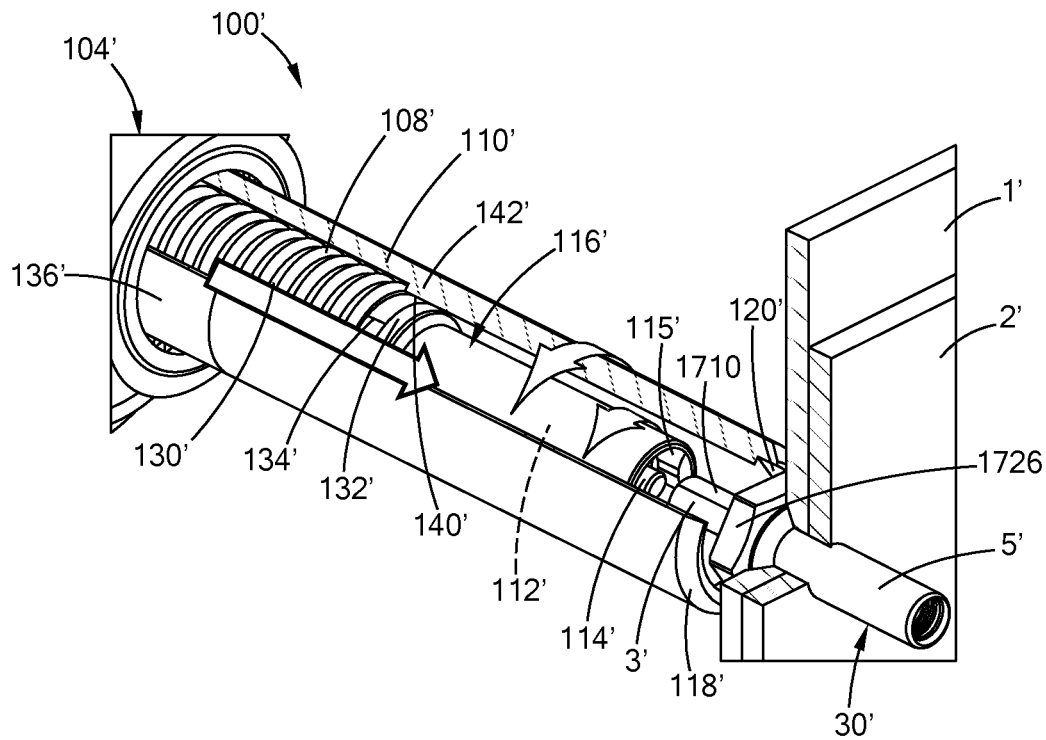
FIG. 21
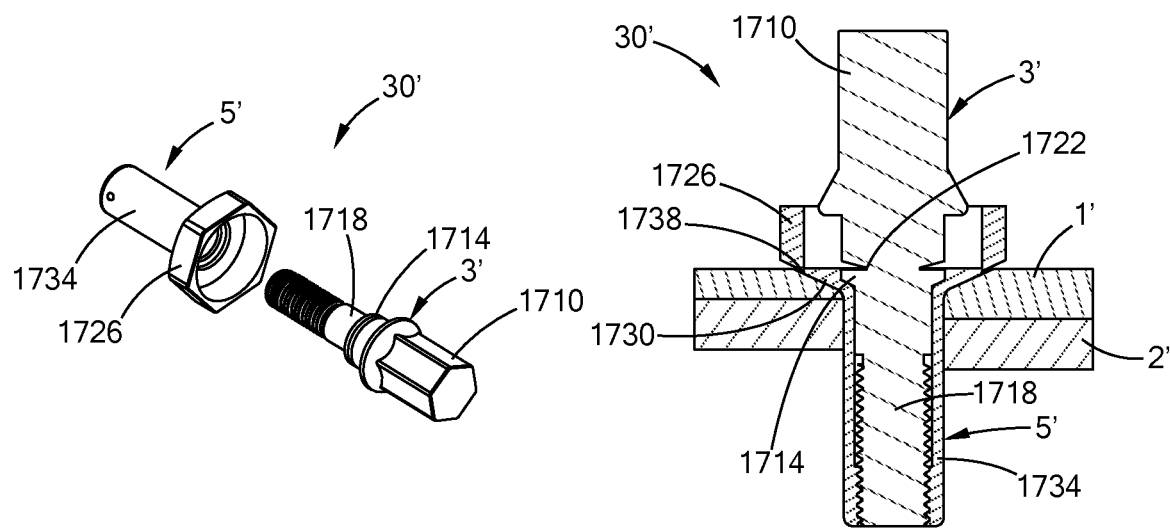
FIG. 22
FIG. 23

AUTOMATIC DOUBLE-ACTION FASTENER INSTALLATION TOOL

CROSS-REFERENCE TO RELATED APPLICATIONS

This application claims priority to and the benefit of U.S. Provisional Application 62/591,617 filed on Nov. 28, 2017. This Application is also related to co-pending U.S. application Ser. No. 16/201,919 filed on Nov. 27, 2018, and co-pending U.S. application Ser. No. 16/201,775 filed on Nov. 27, 2018, which are commonly assigned with the present application. The disclosures of the above applications are incorporated herein by reference.

FIELD

The present disclosure relates generally to hand tools, and more particularly to hand tools for installing blind fasteners having a core bolt and a sleeve around the core bolt for connecting panels from one side of the panels.

BACKGROUND

The statements in this section merely provide background information related to the present disclosure and may not constitute prior art.

A blind fastener is typically used to secure multiple panels together and to be installed from one side (i.e., a front side) of the panels. The blind fastener may include a core bolt and a sleeve surrounding the core bolt, which are inserted into a hole of the panels. A portion of the sleeve adjacent to a rear side of the panel may be deformed during installation of the fastener. The deformed portion of the sleeve provides a bearing surface to induce preload in the fastener such that the panels can be clamped together.

After the deformed portion of the sleeve is formed, the core bolt may be rotated to provide a preload to the fastener. When the fastener is completely installed, a front portion of the core bolt may break off. Installing the blind fastener is time-consuming because installation of the fastener requires tightening the core bolt to deform the sleeve and breaking off portions of the core bolt and the core nut.

SUMMARY

In one form, a tool for installing a blind fastener including a core bolt and a core nut is provided. The tool includes a driving member, a collet driven by the driving member for engaging the core bolt, and an external sleeve for holding the core nut and preventing the core nut from rotating during installation of the blind fastener. The external sleeve is movable between a first position in which the external sleeve is driven by the collet to rotate with the collet and a second position in which the external sleeve is stationary despite rotating action of the collet.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 21 is a perspective cutaway view of the tool of FIG. 17, illustrating the tool in a first operating mode and disengaged from a blind fastener of a second construction;

FIG. 22 is a perspective exploded view of the blind fastener of FIG. 17;

FIG. 23 is a cross-sectional view of the blind fastener of FIG. 17 in a pre-installed condition;

DETAILED DESCRIPTION

The following description is merely exemplary in nature and is not intended to limit the present disclosure, application, or uses.

Figure 1:
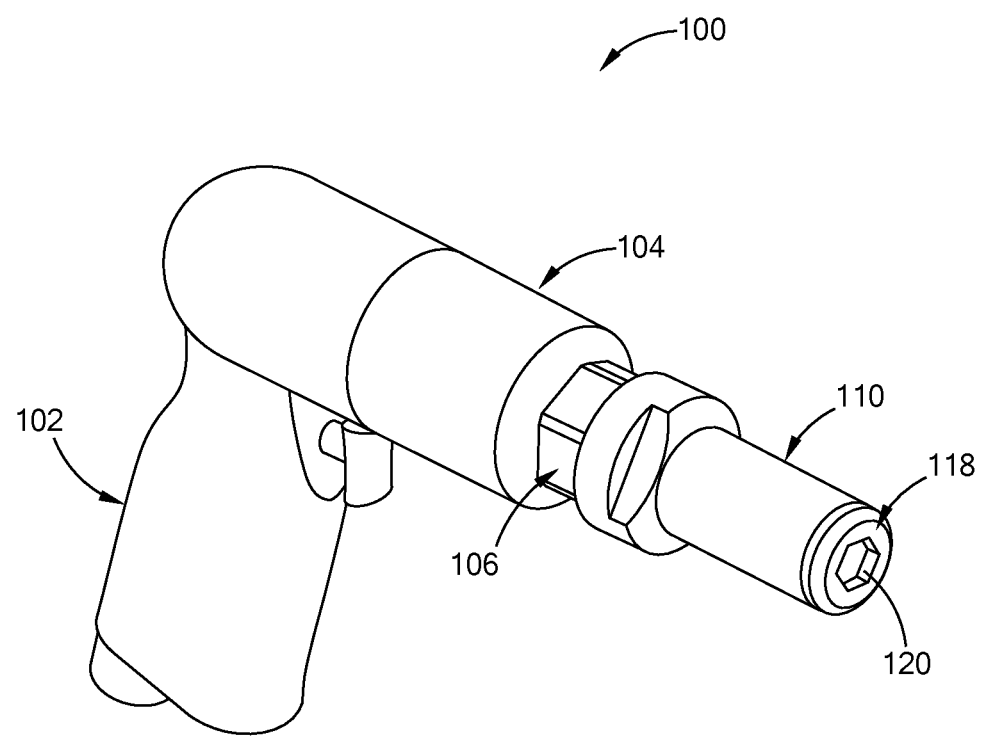
FIG. 1 is a perspective view a tool for installing a blind fastener constructed in accordance with the teachings of the present disclosure.
Figure 2:
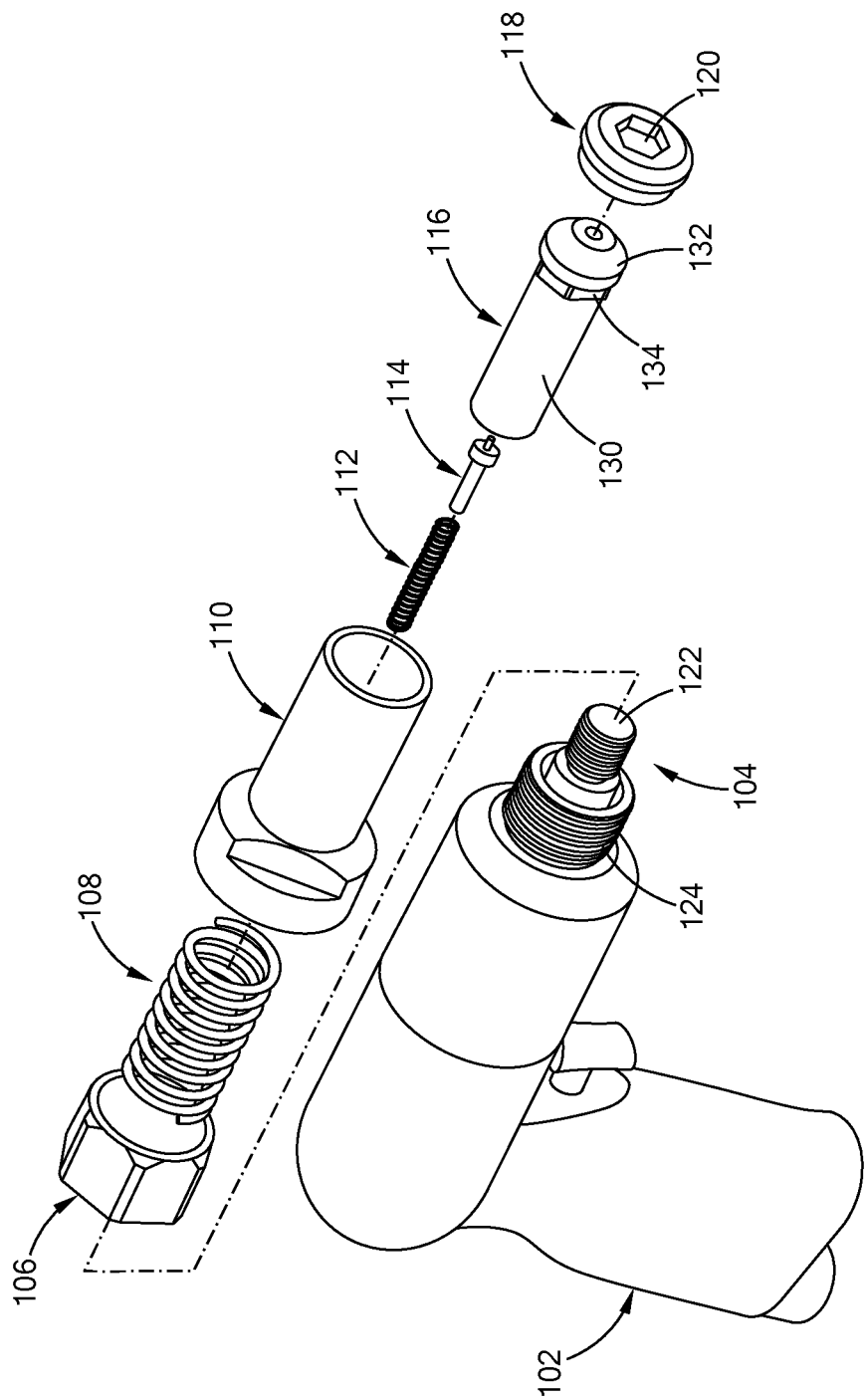
FIG. 2 is a partial exploded view of the tool of FIG. 1.

Referring to FIGS. 1 to 2, a tool 100 for installing a blind fastener includes a handle 102, a nutrunner or automation interface 104, a stationary nut 106, a first compression spring 108, an external sleeve 110, a second compression spring 112, a stem ejector 114, a collet 116, and a nose piece 118. The nose piece 118 defines a handling member receiving space 120 for receiving a nut head of a blind fastener and functions as a double action attachment, which will be described in more detail later.

The nutrunner 104 has a driving end 122 for driving the collet 116, and a head portion 124 for engaging the stationary nut 106. The driving end 122 has outer threads for engaging inner threads of the collet 116. The head portion 124 includes outer threads for engaging inner threads of the stationary nut 106 so that the stationary nut 106 is secured to the nut runner 104. The collet 116 is connected to the driving end 122 and rotationally driven by the driving end 122. The collet 116 has a cylindrical portion 130, an enlarged portion 132, and a driving hex 134 disposed therebetween. The nosepiece 118 is mounted to an end of the external sleeve 110 and defines a handling member receiving space 120 therein. The nosepiece 118 and the external sleeve 110 may be integrally formed as a one-piece component as shown in FIGS. 4 and 5.

Figure 3:
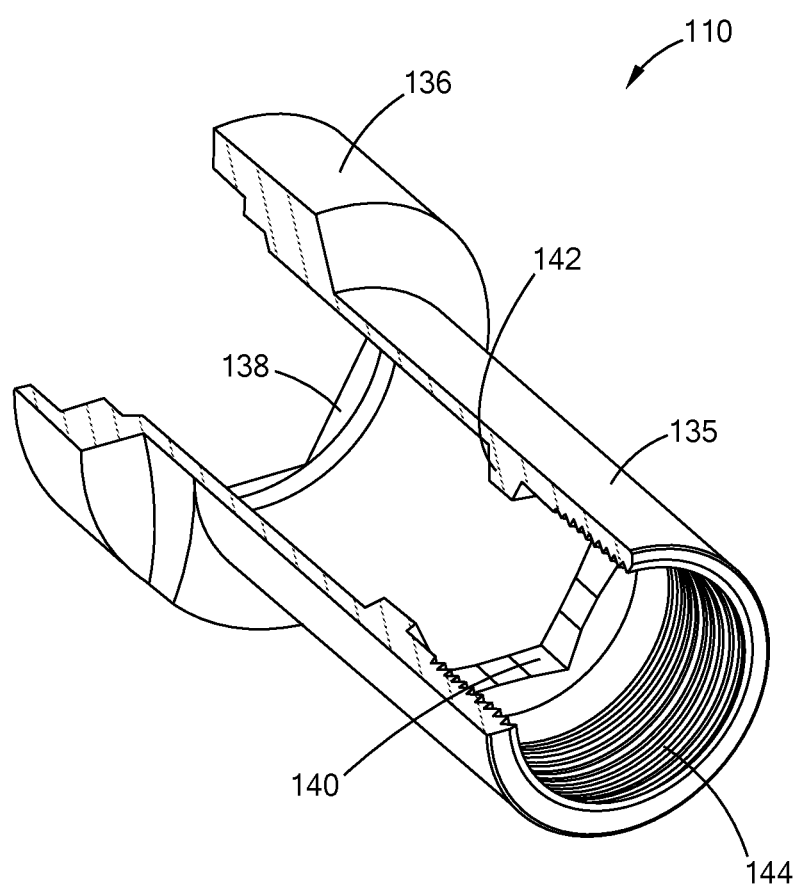
FIG. 3 is a perspective, cross-sectional view of an external sleeve of the tool of FIG. 2.

Referring to FIG. 3, the external sleeve 110 includes a cylindrical portion 135, an enlarged portion 136, a first hex socket 138 disposed in the enlarged portion 136, and a shoulder 142 extending radially from an inner surface of the cylindrical portion 135. The inner surface of the shoulder 142 defines a second hex socket 140. The inner surface of the cylindrical portion 135 further defines inner threads 144 so that the nosepiece 118 can be attached to the cylindrical portion 135 of the external sleeve 110 in a threaded connection. While the sockets 138 and 140 and driving hex 134 are described and shown as hexagonal shaped, other shapes can be used.

The second hex socket 140 is configured to engage the driving hex 134 of the collet 116 when the external sleeve 110 is moved to a first position (shown in FIG. 6) so that the external sleeve 110 can be driven by the collet 116 to rotate with the collet 116. The first hex socket 138 is configured to surround and engage the stationary nut 106 when the external sleeve 110 is moved to a second position (shown in FIG. 7) so that the external sleeve 110 remains stationary.

Figure 4:
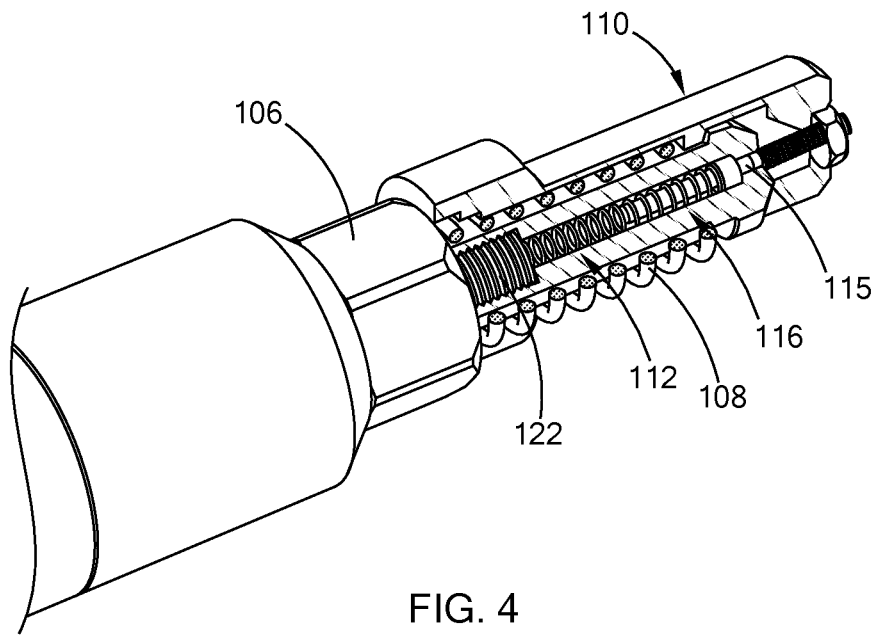
FIG. 4 is a cutaway view of the tool of FIG. 1, wherein a broken-off portion of the fastener is shown to be disposed inside the tool.
Figure 5:
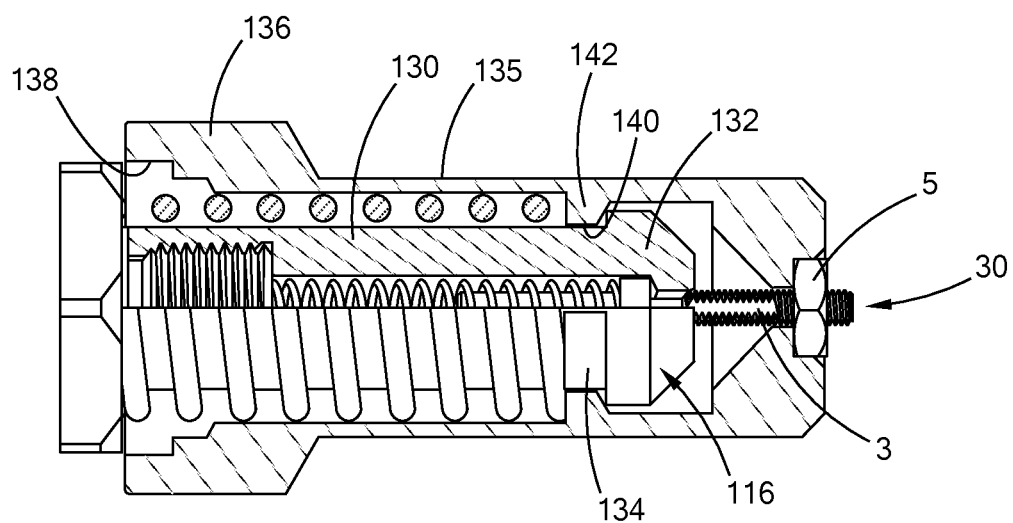
FIG. 5 is another cutaway view of the tool of FIG. 1, wherein a broken-off portion of the fastener is shown to be disposed inside the tool.

Referring to FIGS. 4 and 5, the collet 116 has a first end engaging the driving end 122 of the nutrunner 104 and a second end configured to engage a core bolt 3 of a blind fastener 30. In the example provided, the second end of the collet 116 defines an aperture 115 open through the second end that has a shape that is configured to grip and rotate the front end 13 of the core bolt 3. In the example provided, the front end 13 of the core bolt 3 includes a plurality of flat surfaces configured to be engaged by a plurality of mating flat surfaces within the aperture 115. The collet 116 defines an internal space for receiving the second compression spring 112 and the stem ejector 114 therein. The second compression spring 112 is disposed around a rear portion of the stem ejector 114 and abuts a forward portion of the stem ejector 114 to bias the stem ejector forward (i.e., away from the first end of the collet 116. The forward portion of the stem ejector 114 is configured to be received in the aperture 115 and positioned so that the front end 13 of the core bolt 3 axially displaces the stem ejector 114 when the front end 13 is received in the aperture 115.

The first compression spring 108 is disposed around the cylindrical portion 130 of the collet 116 and between the shoulder 142 and the stationary nut 106. The external sleeve 110 and the nose piece 118 may be formed as a one-piece component so that the external sleeve 110 also defines a handling member receiving space 120. The first compression spring 108 is disposed at one side of the shoulder 142 and the enlarged head 132 of the collet 116 is disposed on the other side of the shoulder 142. The first compression spring 108 is configured to bias the external sleeve 110 forward relative to the stationary nut 106.

The external sleeve 110 is movable relative to the collet 116 along a longitudinal axis of the collet 116 between a first position (shown in FIGS. 4-6) where the second hex socket 140 engages the driving hex 134 of the collet 116 and the first hex socket 138 is disengaged from the stationary nut 106 and a second position (shown in FIG. 7) where the second hex socket 140 of the external sleeve 110 is disengaged from the driving hex 134 of the collet 116 and the first hex socket 138 of the external sleeve 110 engages stationary nut 106.

Figure 6:
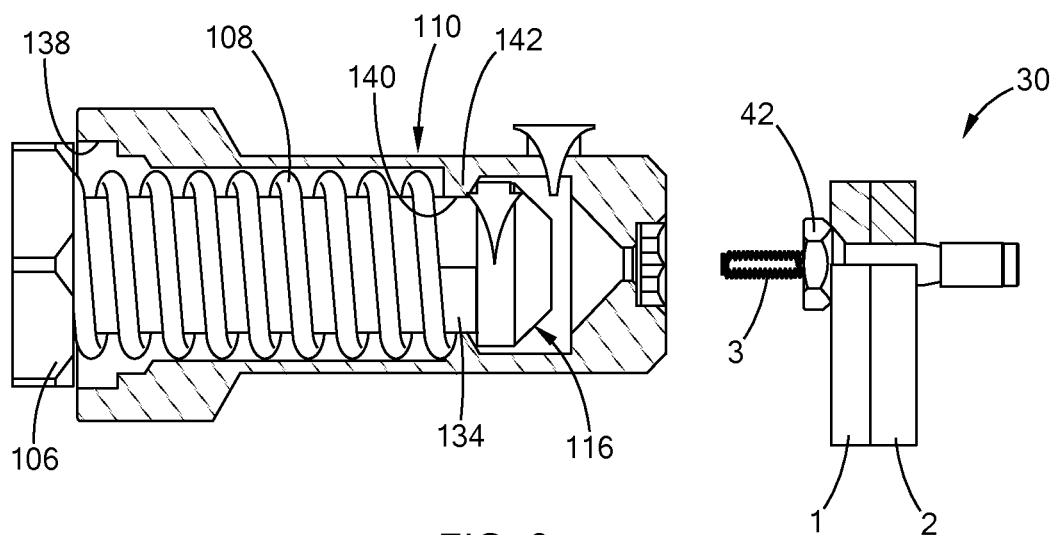
FIG. 6 is a partial, cross-sectional view of the tool, showing an external sleeve to be in a first position and the tool is operated in a first operating mode.
Figure 7:
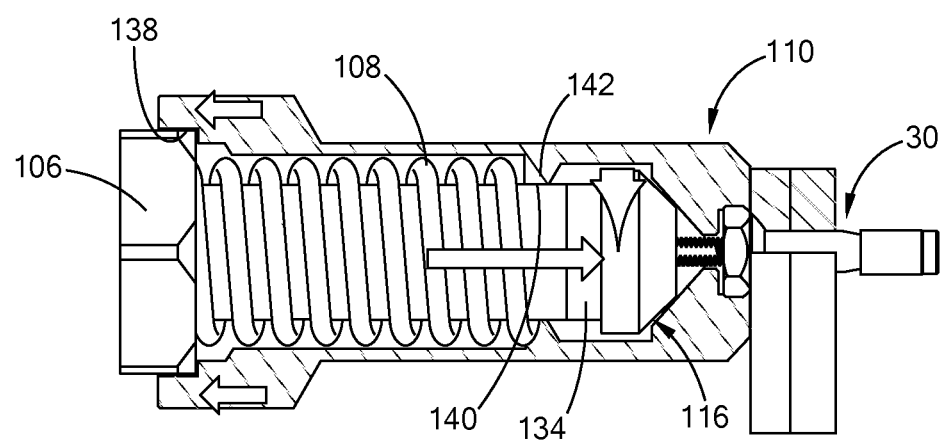
FIG. 7 is another partial, cross-sectional view of the tool, showing an external sleeve to be in a second position and the tool is operated in a second operating mode.

Referring to FIGS. 6 and 7, the tool 100 is operable in two operating modes: in the first operating mode, the external sleeve 110 is moved away from the stationary nut 106 along the longitudinal direction of the collet 116 to the first position where the second hex socket 140 engages the driving hex 134, as shown in FIG. 6. By this engagement, the external sleeve 110 can be driven by the collet 116 to rotate together with the collet 116. In the second operating mode, the external sleeve 110 is moved toward the stationary nut 106 to the second position where the first hex socket 138 of the external sleeve 110 engages the stationary nut 106, as shown in FIG. 7. In this second position, the second hex socket 140 of the external sleeve 110 is disengaged from the driving hex 134 of the collet 116. Therefore, the external sleeve 110 remains stationary despite the rotating action of the collet 116. In the second position, the first compression spring 108 is compressed between the stationary nut 106 and the internal shoulder 142 to bias the internal shoulder in the axial direction away from the stationary nut 106. When the force that pushes the external sleeve 110 to the stationary nut 106 is released (e.g., the external sleeve is no longer pressed against a workpiece 1), the first compression spring 108 can push the external sleeve 110 back to the first position.

Figure 8:
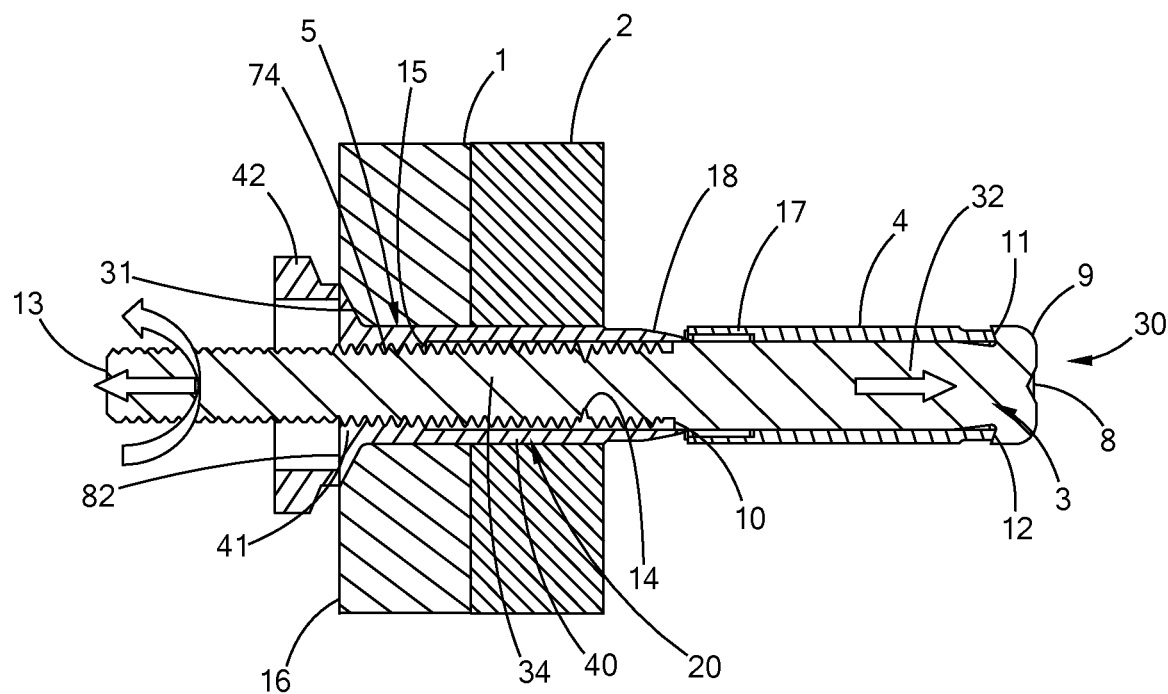
FIG. 8 is a cross-sectional view of a blind fastener to be installed by the tool of FIG. 1.
Figure 9:
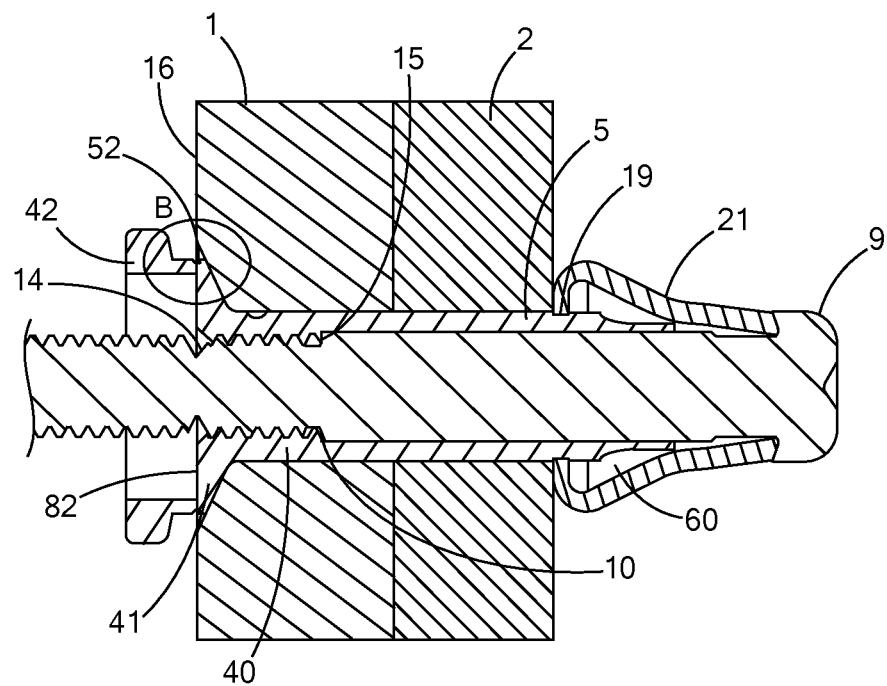
FIG. 9 is a cross-sectional view of the blind fastener of FIG. 8, showing the blind fastener is partially installed by the tool of FIG. 1.
Figure 10:
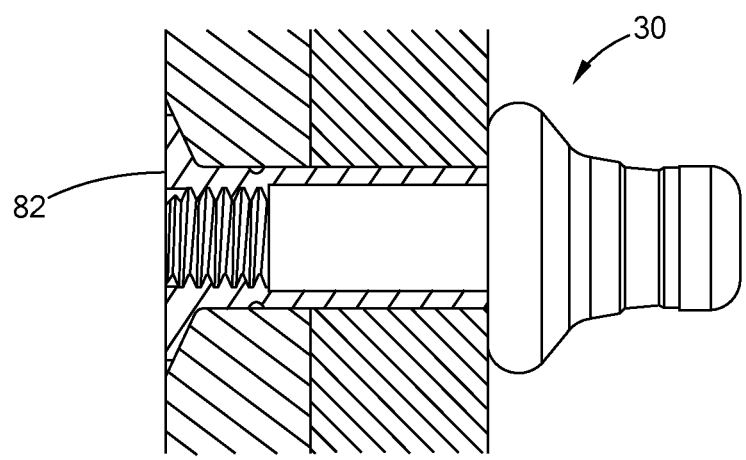
FIG. 10 is a cutaway view of the blind fastener of FIG. 8, showing the blind fastener is its final installation state with flush surfaces generated on a core bolt and on a core nut by the tool of FIG. 1.
Figure 11A:
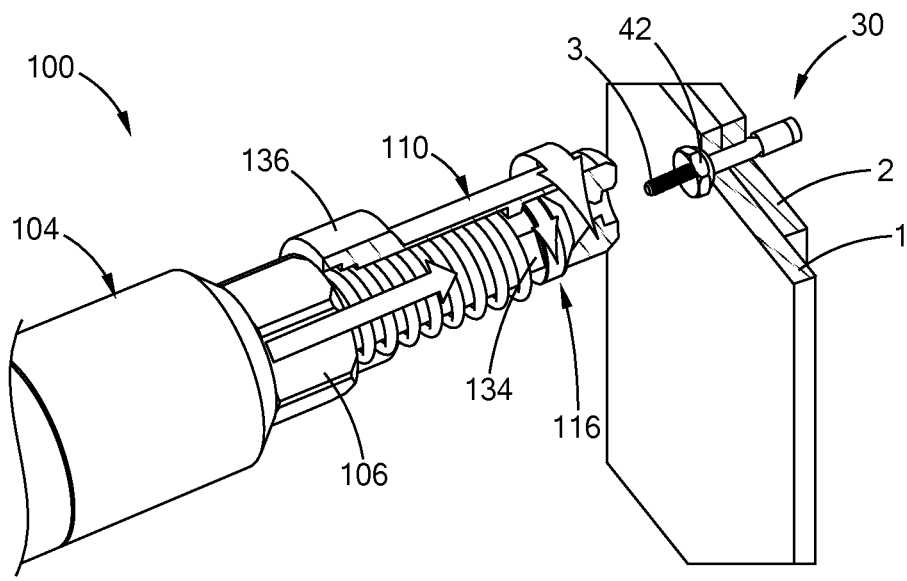
FIGS. 11A and 11B depict the tool is in a first operating mode during initial installation of the fastener.
Figure 11B:
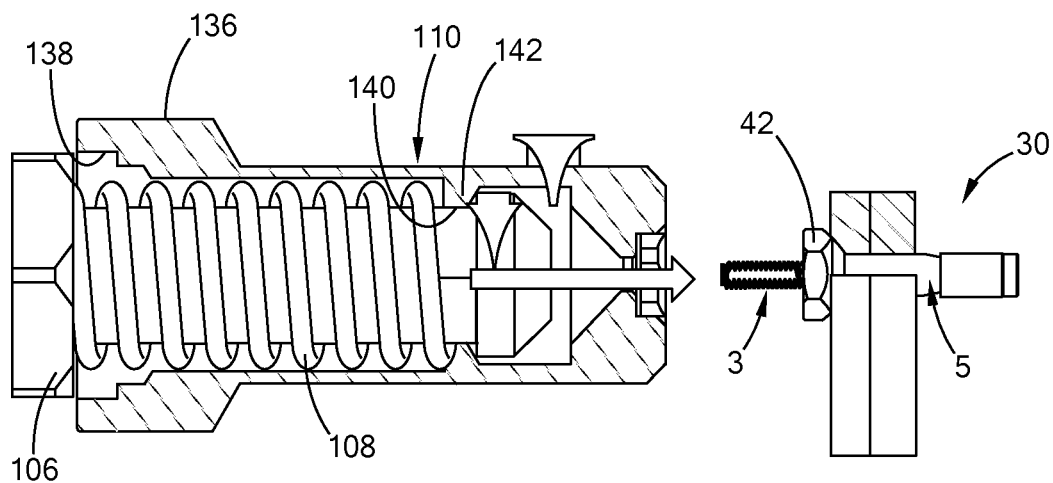

Referring to FIGS. 8 to 10, the tool 100 is configured to install a blind fastener 30 shown in FIGS. 8 to 10. The blind fastener 30 can be similar to the blind fastener described and shown in co-pending and commonly assigned U.S. patent application Ser. No. 16/201,919, the disclosure of which is incorporated herein by reference. Generally, the blind fastener 30 is configured to connect a plurality of panels including a front panel 1 and a rear panel 2, and is configured to be inserted into a countersunk hole 31 of the front and rear panels 1 and 2. The blind fastener 30 includes a core bolt 3, a core nut 5 surrounding a middle portion of the core bolt 3, and a sleeve 4 surrounding a rear portion of the core bolt 3. The rear portion of the core bolt 3 defines a smooth section 32, and the front portion and the middle portion of the core bolt 3 defines a threaded section 34. A core bolt stop shoulder 10 may be defined between the smooth section 32 and the threaded section 34 of the core bolt 3.

The smooth section 32 of the core bolt 3 has an outer peripheral surface constituting a smooth rotational surface 12. The threaded section 34 of the core bolt 3 includes outer threads and a break-off notch 14 adjacent to the core bolt stop shoulder 10. The break-off notch 14 constitutes a weaker point at the core bolt 3 so that the core bolt 3 can be broken at the break-off notch 14 after the blind fastener 3 is completely installed in the panels 1 and 2. The break-off notch 14 is positioned such that it is aligned with the front side 16 of the front panel 1 when the stop shoulders are engaged 10, 15 so that it will break off flush with or recessed from the front side 16 of the front panel 1.

The core bolt 3 further includes a core bolt head 9 at a rear end of the core bolt 3. The core bolt head 9 is disposed outside the sleeve 4 and defines a recess 8 that facilitates a removal process of the fastener 30 at the end of the product lifecycle by drilling out the fastener 30.

The sleeve 4 has a tubular configuration and includes an inner peripheral surface 11 constituting a smooth rotational surface 11 in contact with the smooth rotational surface 12 of the core bolt 3. The smooth rotational surface 12 of the core bolt 3 and the smooth rotational surface 11 of the sleeve 4 function as rotating bearing surfaces, which may be lubricated, when a front end 13 of the core bolt 3 is tightened or loosened to move the core bolt 3 relative to the core nut 5.

The core nut 5 has a tubular configuration and includes a main body 40, a nut head 41, and a handling member 42. The nut head 41 extends radially outward from one end of the main body 40 to have a larger outside diameter than the main body 40. The nut head 41 is between the handling member 42 and the main body 40. A peripheral groove 52 (shown in FIG. 9) is defined between the nut head 41 and the handling member 42. The nut head 41 is configured to be held by the tool 100 of FIGS. 1 to 2 during installation of the fastener 30 to prevent the core nut 5 from rotating when the core bolt 3 is screwed into or out of the core nut 3.

As clearly shown in FIG. 8, during installation of the fastener 30, the main body 40 and nut head 41 of the core nut 5 are disposed in the countersunk hole 13 of the front and rear panels 1 and 2. The handling member 42 is disposed outside the front and rear panels 1 and 3. The peripheral groove 52 between the handling member 42 and the nut head 41 functions as a break-off groove to allow the handling member 42 to break off after the fastener 30 is completely installed.

During initial installation, the threaded part 74 of the core nut 3 is threadedly engaged to the threaded section 34 of the core bolt 3. The break-off notch 14 of the core bolt 3 is disposed away from the front surface 16 of the front panel 1, and the core bolt stop shoulder 10 is disposed away from the core nut stop shoulder 15 of the core nut 5. The end surface 82 of the nut head 41 of the core nut 5 and the break-off groove 52 of the core nut 5 are flush with the front surface 16 of the front panel 1.

Referring to FIG. 9, by tightening the core bolt front end 13, the core bolt head 9 is moved towards the core nut 5 until the core bolt stop shoulder 10 comes to a positive stop and abuts against the core nut stop shoulder 15. Concurrently, the break-off notch 14 is moved to be flush with the front surface 16 of the front panel 1 and the end surface 82 of the core nut 3. The break-off groove 52 is also flush with the front surface 16 of the front panel 1. It is understood that that core bolt stop shoulder 10 and the core nut stop shoulder 15 are optional and do not have to be present in the blind fastener 30 to create flush surfaces in the blinder fastener 30 after the blind fastener is completely installed. As the core bolt 3 is tightened and the core bolt head 9 is moved toward the core nut 5, the sleeve 4 is compressed and deformed by the core bolt head 9 to form a bulb portion 21.

Referring to FIG. 10, after the sleeve 4 forms a bulb portion 21, by continuing to apply a torsional force on the core bolt 3, the threaded front portion of the core bolt 3 may break off at the break-off notch 14. A flush surface is thus formed on the core bolt 3. Also, by applying torsional force on the core nut 5, the handling member 42 breaks off at the break-off groove 52 and thus another surface 82 is formed on the core nut 5 to be flush with the front surface 16 of the front panel 1.

To install this type of fastener, a three-step process is typically required. In the first step, a first tool (not shown) is used to screw out the core bolt 3 from the core nut 5 to form the bulb portion 21 while the handling portion 42 of the core nut 5 is held by a second tool (not shown). In the second step, the front portion 13 of the core bolt 3 is broken off by rotating the first tool further. In a third step, the handling portion 42 of the core nut 5 is broken off by rotating the second tool to generate surfaces flush with the front panel 1.

Referring to FIGS. 11A to 11D, the blind fastener 30 may be installed in the panels 1 and 2 by using the single tool 100 of FIGS. 1 and 2. Instead of using a three-step process, the tool 100 of the present disclosure can be used to achieve a double action by installing the fastener while holding the handling portion 42 stationary and then automatically shifting the torque to the handling portion 42 to break handling portion 42 off the core nut 5.

The blind fastener 30 may be first inserted into the countersunk hole in the panels. Initially, the tool 100 is operated in the first operating mode where the first compression spring 108 is in its released state and the second hex socket 140 of the external sleeve 110 engages the driving hex 134 of the collet 116. When the nutrunner 104 starts to drive, the external sleeve 110 rotates with the collet 116. In the first operating mode, the external sleeve 110 is in the first position. In the first operating mode, both the collet 116 and the external sleeve 110 can apply a torque to the fastener 30.

Figure 12A:
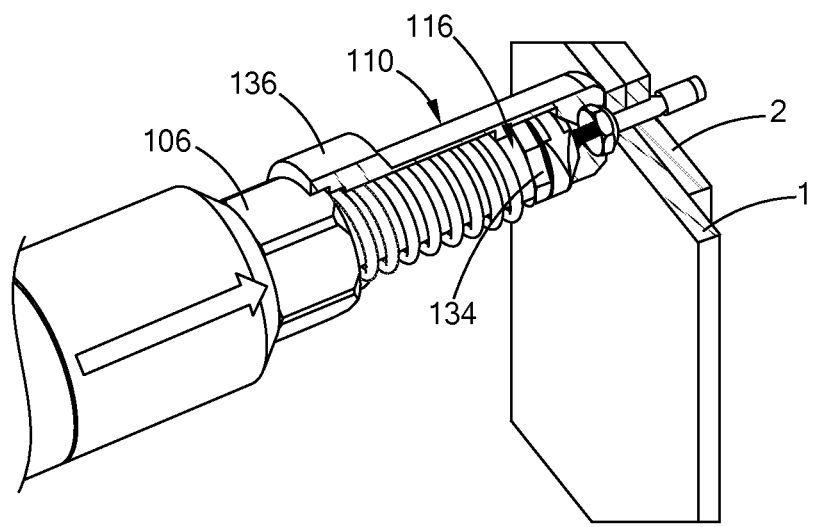
FIGS. 12A and 12B depict the tool is in a second operating mode when the tool screws a core bolt of the fastener out of the core nut.
Figure 12B:
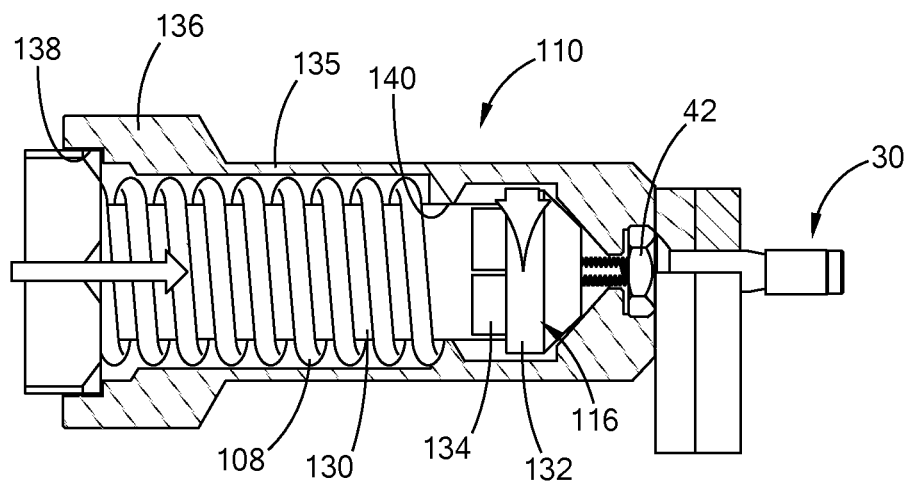

Referring to FIGS. 12A and 12B, the tool 100 is moved closer to the front panel 1 so that the front end 13 of the core bolt 3 is received in the aperture 115 of the collet 116 to be gripped by the collet 116 for rotation therewith and the handling portion 42 is received in the handling member receiving space 120 to be gripped by the nose piece 118. By continuing to move the collet 116 toward the front panel 1, the external sleeve 110 is moved relative to the collet 116 to the second position to engage the stationary nut 106. In the example provided, the external sleeve 110 also contacts the front panel 1 in the second position. In this second position, the tool 100 is operated in the second operating mode where the external sleeve 110 is not driven by the collet 116. In this position and operating mode, the core bolt 3 of the fastener 30 is driven by the collet 116 and the external sleeve 110 holds the handling member 42 of the core nut 5 so that the core nut 5 does not rotate while the core bolt 3 is screwed out of the core nut 5. In the second operating mode, torque is applied by the collet 116 to the core bolt 3.

Figure 13A:
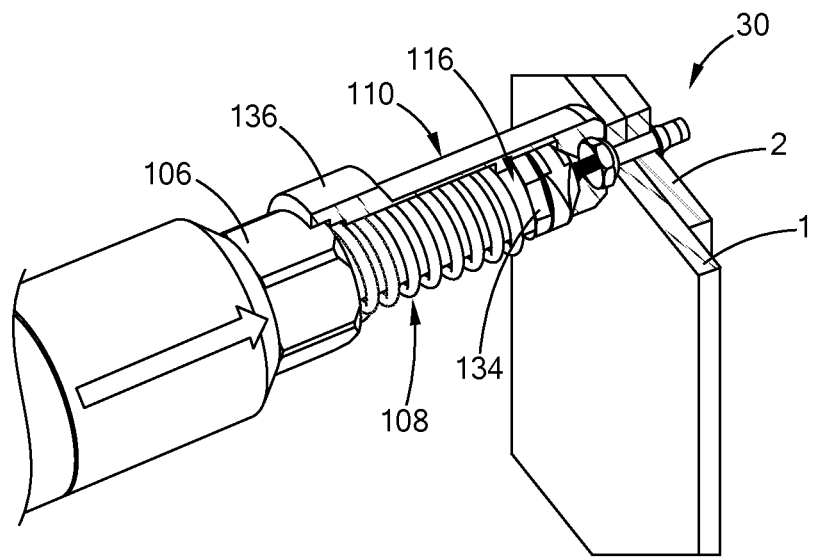
FIGS. 13A and 13B depict the tool continues to be in a second operating mode when a sleeve of the fastener is deformed to form a bulb portion.
Figure 13B:
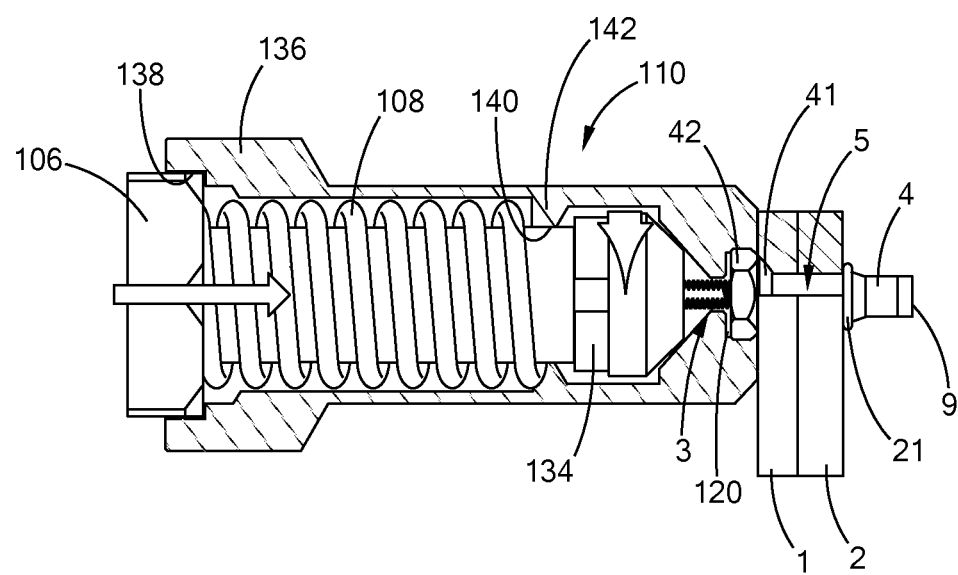

Referring to FIGS. 13A and 13B, when the core bolt 3 is screwed out of the core nut 5, the sleeve 4 of the fastener is deformed to form the bulb portion 21 between the rear panel 2 and the core bolt head 9. As a result, the front and rear panels 1 and 2 are clamped between the nut head 41 of the core nut 5 and the bulb portion 21 of the sleeve 4. When the core bolt 3 reaches the stop shoulder 15 (shown in FIG. 9), continuing to apply the torsional force on the core bolt 3 causes the break-off notch 14 (shown in FIG. 9) of the core bolt 3 to shear off, thereby breaking off the front end of the core bolt 3.

Figure 14A:
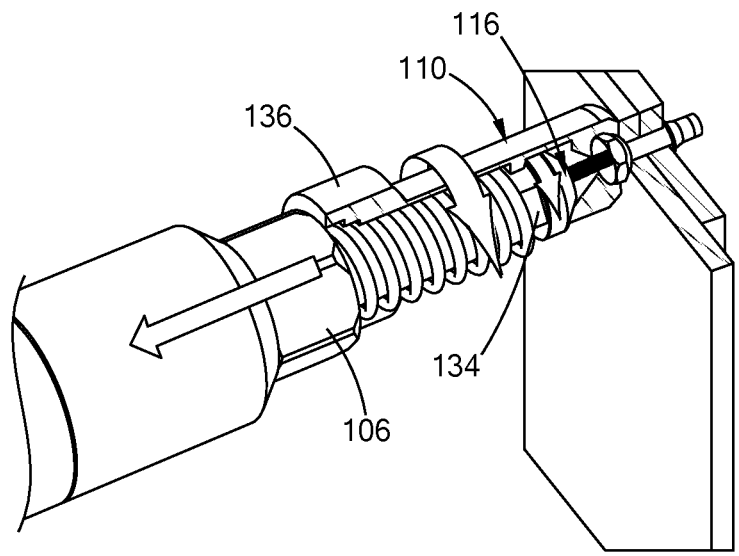
FIGS. 14A and 14B depict the tool returns to the first operating mode after the bulb portion is completely formed.
Figure 14B:
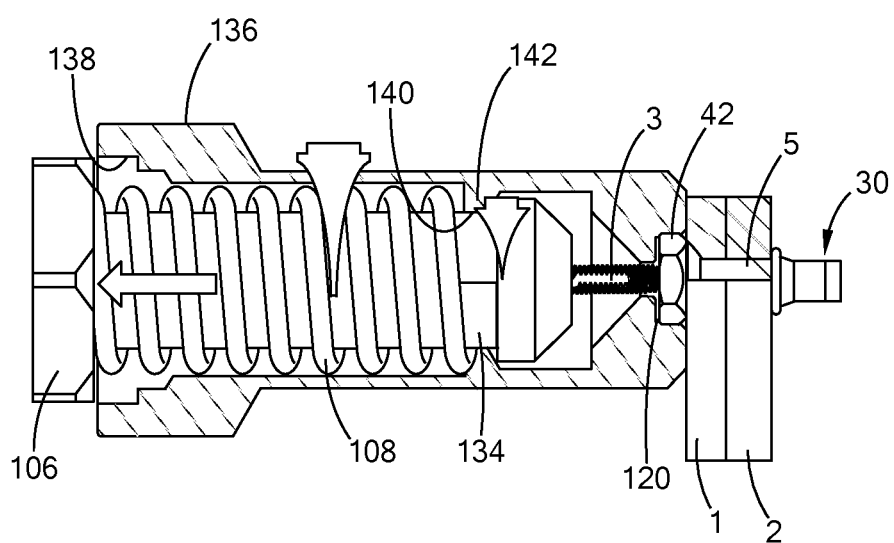

Referring to FIGS. 14A and 14B, with the nutrunner 104 continuing to run, moving the tool 100 away from the front panel 1 causes the external sleeve 110 to be pushed back to the first positon by the first compression spring 108 so that the second hex socket 142 of the external sleeve 110 engages the driving hex 134 of the collet 116 and the external sleeve 110 rotates with the collet 116. The full torque rotation of the external sleeve 110 causes shearing off the handling portion 42, generating a flush surface on the core nut 5.

Figure 15A:
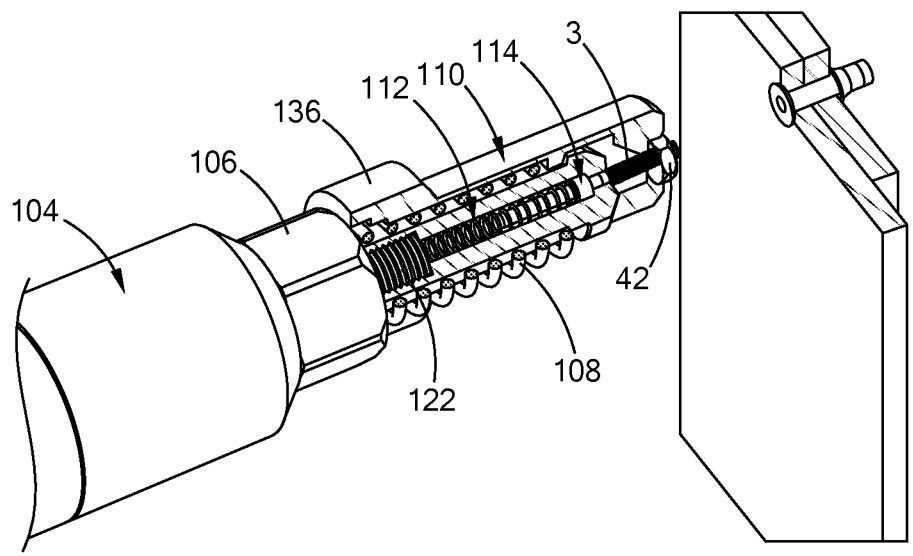
FIGS. 15A and 15B depict the tool is moved away from the front panel to break off portions of the fastener to create flush surfaces after the installation is complete.
Figure 15B:
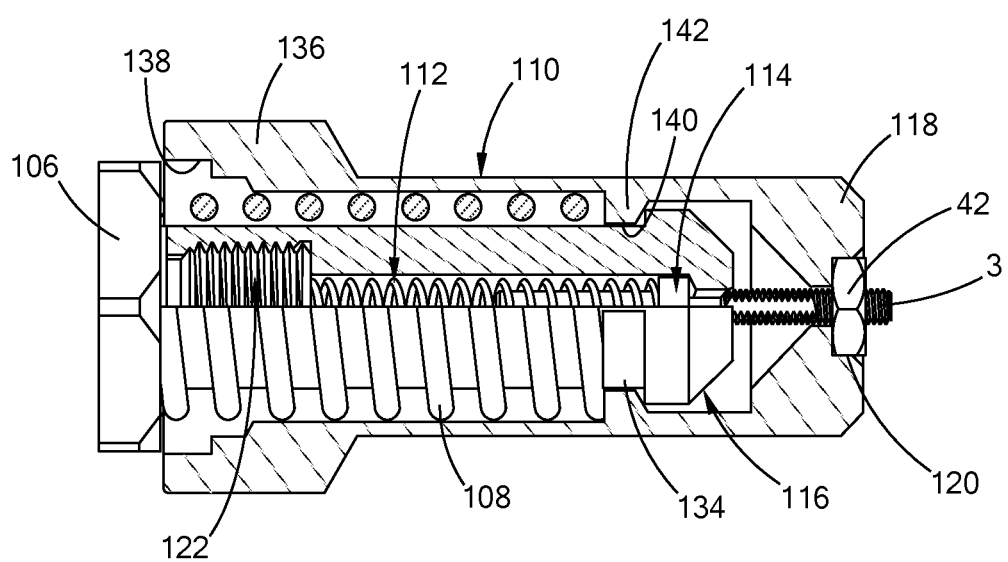

Referring to FIGS. 15A and 15B, after the handling portion 42 and front end of the core bolt 3 break off, the handling portion 42 and the front end of the core bolt 3 remain inside the external sleeve 110 and the nose piece 118. The nutrunner 104 can be stopped. Once the nutrunner 104 is stopped, the second compression spring 112 pushes the stem ejector 114, which in turn pushes the front end of the core bolt 3 and the handling member 42 out of the external sleeve 110 and the nose piece 118.

Figure 16A:
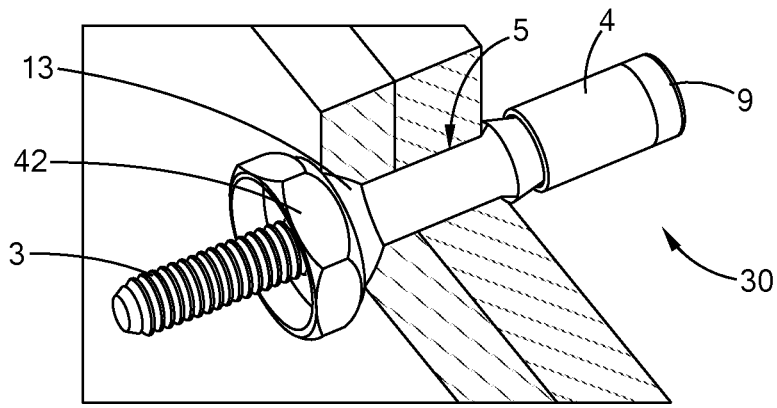
FIGS. 16A to 16D depict the conditions of the fasteners and the torque applied to the fasteners during installation.
Figure 16B:
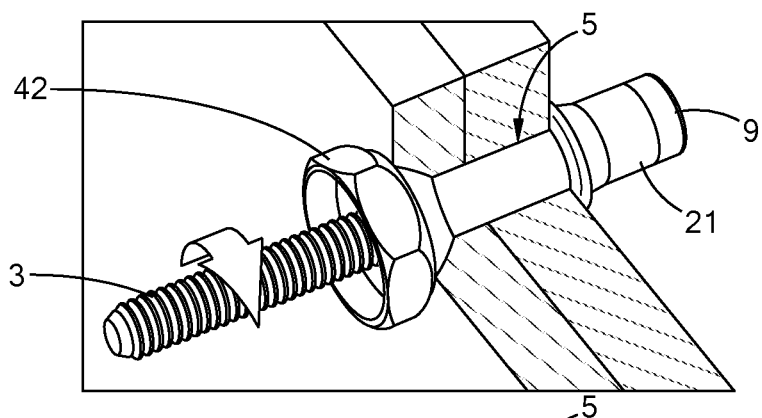

Referring to FIGS. 16A to 16D, to use the tool 100 of the present disclosure to install the fastener 30, the fastener is first placed in the countersunk hole 13 of the panels as shown in FIG. 16A. Next, a torsional force is applied by the collet 116 of the tool 100 to the core bolt 3 to screw the core bolt 3 out of the core nut 5 as shown in FIG. 16B. The handling portion 42 is held by the external sleeve 110 of the tool 100, which is stationary in the second operating mode, to prevent the core nut 5 from rotating when the core bolt 3 is screwed relative to the core nut 5.

Figure 16C:
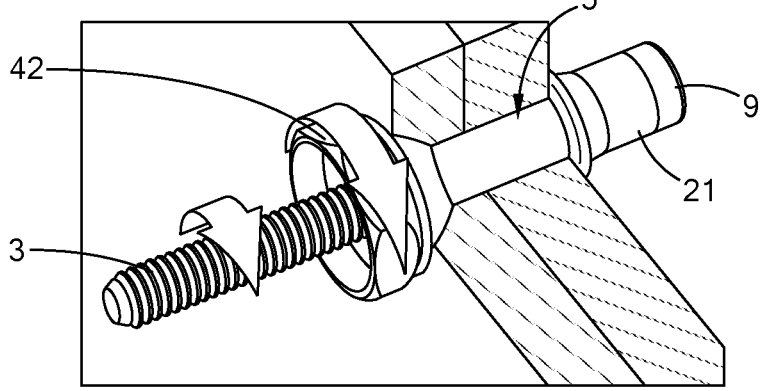
Figure 16D:
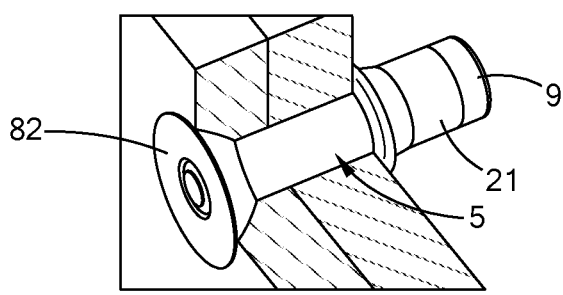
Figure 17:
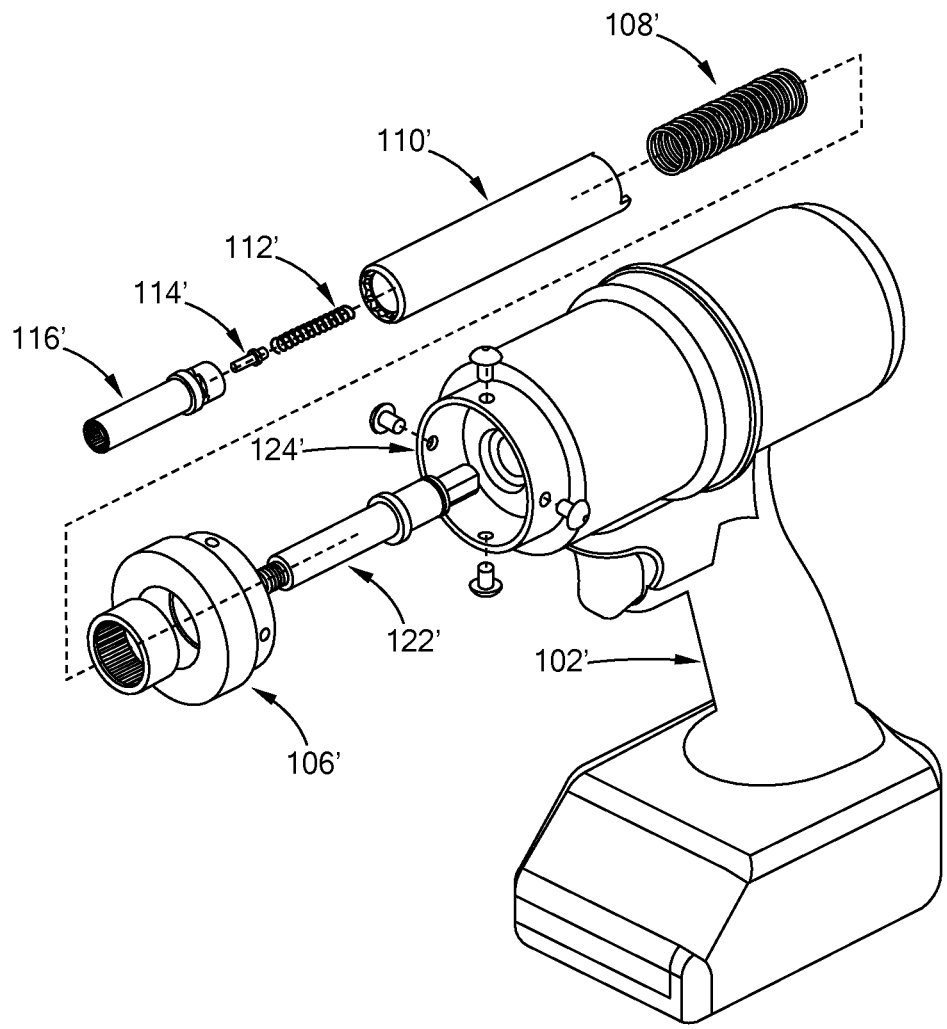
FIG. 17 is a perspective exploded view of a tool of a second construction in accordance with the teachings of the present disclosure.

After the sleeve 4 of the fastener 30 is deformed to form a bulb portion 21, the external sleeve 110 of the tool 100 is moved to the first position and tool 100 is operated in the first operating mode. As a result, the collet 116 of the tool 100 continues to apply the torsional force to the core bolt 3 and the external sleeve 110 starts to apply a torsional force to the handling member 42 as shown in FIG. 16C. The torsional force applied by the external sleeve 110 to the handling member 42 is greater than the torsional force applied by the collet 116 to the core bolt 3. The torsional force by the external sleeve 110 and the collet 116 will cause the handling member 42 and the front end of the core bolt 3 to break off, thereby forming flush surfaces on the core bolt 3 and the core nut 5, as shown in FIG. 16D.

In the example provided, full installation of the fastener only requires about 5 rotations of the nutrunner 104 and the cycle time for an average nutrunner 104 (at 300 RPM) would be about 1 second, though other speeds and cycle times can be used. In the example provided, the installation process by the tool is automatic, making the typically three-step installation process an automatic dual-action installation process. The tool 100 may use a typical nutrunner or an automation end-effector with minor changes, such as pneumatic or electric nutrunners or end-effectors for example.

Referring to FIGS. 17-21, a tool 100' of a second construction is illustrated. The tool 100' is similar to the tool 100 (FIGS. 1-7 and 11A-15B), except as otherwise shown or described herein. Features of tool 100' that are similar to features of tool 100 (FIGS. 1-7 and 11A-15B) are identified with similar, but primed reference numerals, and only differences are described in detail herein. In the example provided, the tool 100' is configured to install a blind fastener 30' of a second construction.

Referring to FIGS. 22 and 23, the blind fastener 30' includes a bolt 3' and a nut 5'. In the example provided, the bolt 3' is a single, unitarily formed piece and the nut 5' is a single unitarily formed piece. The blind fastener 30' is described in greater detail in U.S. patent application Ser. No. 16/201,775 the disclosure of which is incorporated herein by reference. Generally, the bolt 3' includes a first handling portion 1710, a bolt head 1714, and a shaft 1718. One end of the shaft 1718 includes external threads, while the opposite end of the shaft is coupled to the bolt head 1714. The bolt head 1714 extends radially outward from the shaft 1718. A first frangible portion 1722 of the bolt 3' couples the first handling portion 1710 to the bolt head 1718. The first frangible portion 1722 is configured to break off so that the end of the bolt head 1714 is flush with or recessed from the forward surface of the front panel 1' when a torque applied to the handling portion 1710 exceeds a first threshold.

The nut 5' includes a second handling portion 1726, a nut head 1730, and a sleeve 1734. The sleeve defines a central bore that extends axially through the nut 5'. One end of the sleeve 1734 includes internal threads configured to matingly engage the external threads of the bolt 3', while the opposite end of the sleeve 1734 is coupled to the nut head 1730. The nut head 1730 extends radially outward from the sleeve 1734. The nut head 1730 defines a recess in which the bolt head 1714 is received so that the end surface of the bolt head 1714 is flush or recessed relative to the end surface of the nut head 1730. The nut head 1730 is configured to be received in the counterbored hole of the panels 1' and 2' so that the end surface of the nut head 1730 is flush or recessed relative to the forward surface of the front panel 1'. A second frangible portion 1738 couples the second handling portion 1726 to the nut head 1730. The second frangible portion 1738 is configured to break off so that the end of the nut head 1730 is flush with or recessed from the forward surface of the front panel 1' when a torque applied to the handling portion 1710 exceeds a second threshold. In one configuration, the second threshold can be greater than the first threshold. The second handling portion 1726 surrounds a portion of the first handling portion 1710.

Figure 18:
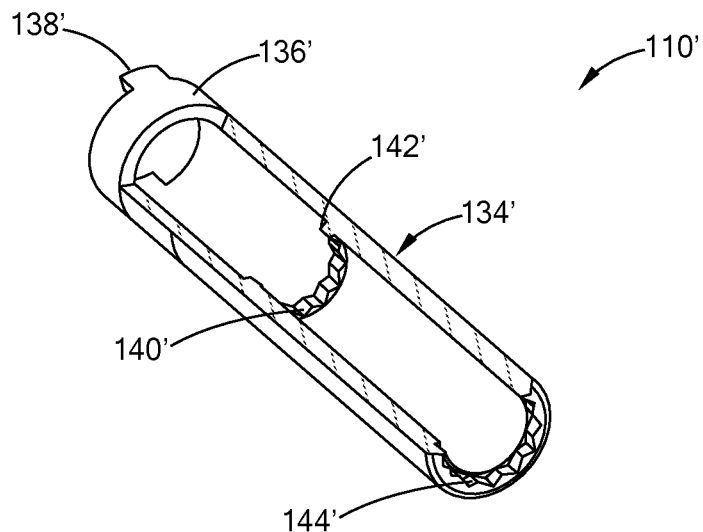
FIG. 18 is a perspective cutaway view of an external sleeve of the tool of FIG. 17.

Referring to FIG. 21, the collet 116' of the tool 100' has an aperture 115' having a predetermined shape that is configured to engage a mating predetermined shape of the first handling portion 1710 of the bolt 3' to rotate the bolt 3'. Referring to FIG. 18, the nose 118' of the tool 100' has a handling member receiving space 120' having a predetermined shape that is configured to engage a mating predetermined shape of the second handling portion 1726. In the example provided, the handling member receiving space 120' is a 12 point star shape that can engage a hexagonal or other shape of the second handling portion 1726, though other shapes can be used for the handling member receiving space 120' or the second handling portion 1726. In the example provided, the second socket 140' is also a 12 point star shape configured to engage the hexagonal shape of the driving hex 134', though other shapes can be used for the second socket 140' and the driving feature 134'.

Figure 20:
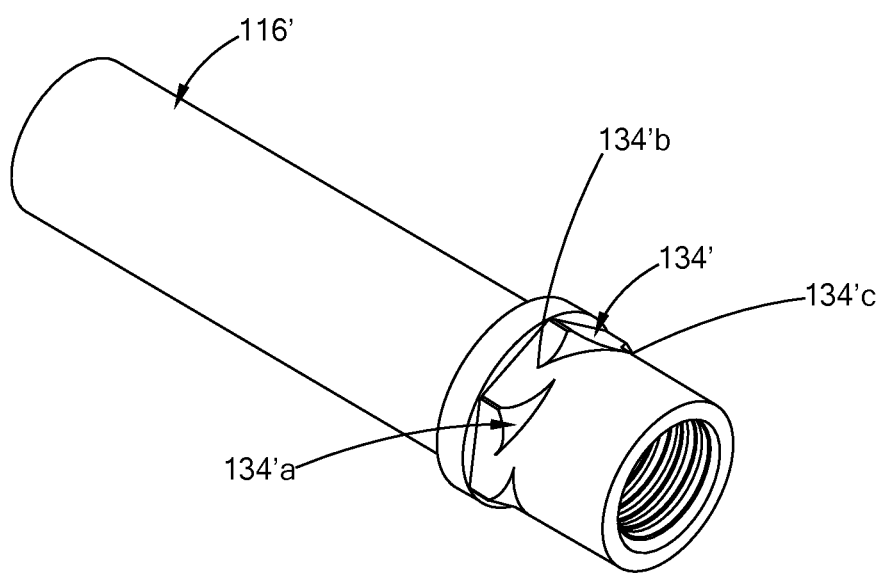
FIG. 20 is a perspective view of a collet of the tool of FIG. 17.

Referring to FIG. 20, the driving hex 134' also includes angular or helical ramps 134'a that angle from the rear side of each point of the hex shape, downward toward the cylindrical surface. In the example provided, the ramps 134'a are also angled axially. In other words, each ramp 134'a can have a leading portion 134'b and a trailing portion 134'c with the leading portion 134'b being axially forward of the trailing portion 134'c and ramps radially outward until meeting the rest of the hexagonal feature (e.g., the hex-flats or the point). These ramps 134'a can aid in rapid engagement of the driving hex 134' with the second socket 140' without the need for perfect alignment of the two features.

Referring to FIG. 21, in operation, the bolt 3' is threaded into the nut 5' until the bolt head 1714 is received in the nut head 1730, as shown in FIG. 23, so that the blind fastener 30' is in a pre-installed condition. The blind fastener 30' is then inserted into the countersunk bore of the panels 1' and 2' until the nut head 1730 is flush with the front panel 1'. In this position, the first and second handling portions 1710 and 1726 extend from the front panel 1'. As shown in FIG. 21, before the tool 100' engages the fastener 30', the tool is in the first operating condition, with the first spring 108' biasing the collet 116' forward so that the driving hex 134' of the collet 116' engages the second socket 140' of the external sleeve 110'. Thus, the collet 116' is in the first position and rotates with the external sleeve 110'.

Figure 19:
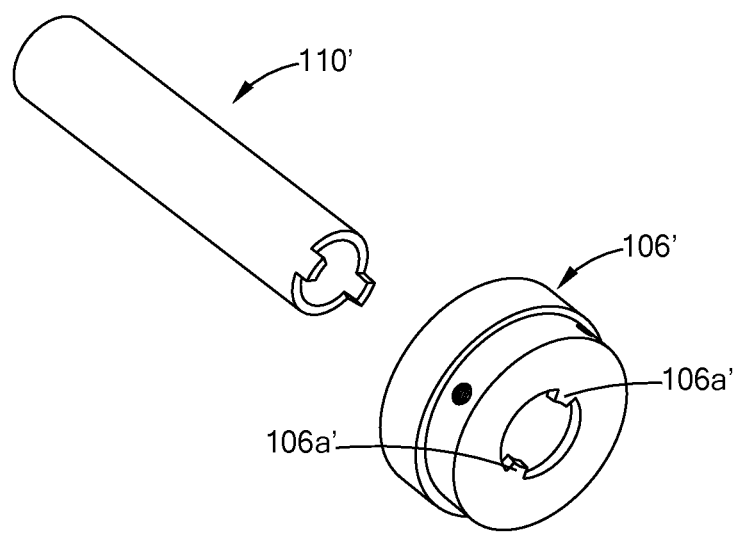
FIG. 19 is a perspective exploded view of the external sleeve of FIG. 18 and a stationary nut of the tool of FIG. 17.
Figure 24:
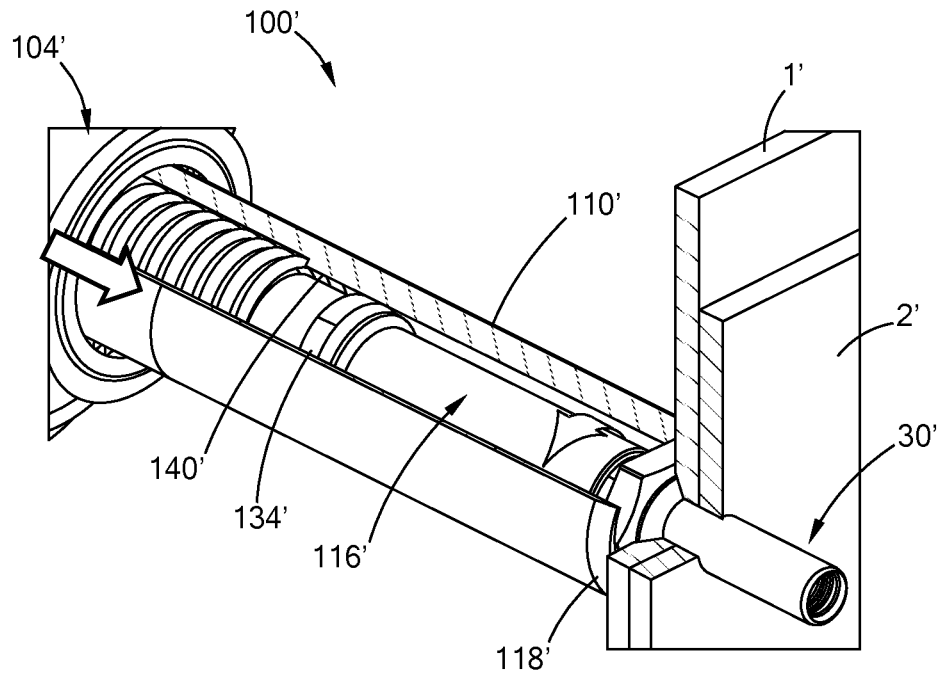
FIG. 24 is a perspective cutaway view of the tool of FIG. 17, illustrating the tool in a second operating mode and engaged with the blind fastener of FIG. 17.

Referring to FIG. 24, the tool 100' is moved forward so that the second handling portion 1726 is received in and engaged by the nose 118'. The tool 100' is moved further forward and the nose 118' abuts the front panel 1' and is pushed rearward relative to the collet 116' until in the second position shown in FIG. 24. In the second position, the driving hex 134' is disengaged from the second socket 140'. Referring to FIG. 19, in the example provided, instead of the external stationary nut 106 (FIG. 4), the nut runner 104 has a stationary nut 106' that defines an internal feature configured to mate with an external feature of the external sleeve 110'. In the example provided, the internal feature is radially inward extending internal lugs 106'*a*, though other configurations can be used (e.g., internal hex or splines), and the external feature are axially extending lugs 138', though other mating configurations can be used. In the first position (FIG. 21), the internal feature of the stationary nut 106' is disengaged from the external feature of the external sleeve 110'. In the second position (FIG. 24), the internal feature of the nut 106' is engaged with the external feature of the external sleeve 110' so that the external sleeve 110' is held rotationally stationary. Thus, in the second position, the tool 100' can be operated in the second operating mode wherein only the collet 116' rotates.

As shown in FIG. 24, the external sleeve 110' holds the nut 5' rotationally stationary while the collet 116' rotates the bolt 3' until a bulb 2110 (FIG. 22) is formed in the sleeve 1734 on the back side of the rear panel 2'. When the bulb 2110 is fully formed, the torque imparted on the bolt 3' by the collet 116' can exceed the first threshold to break off the first handling portion 1710.

Figure 25:
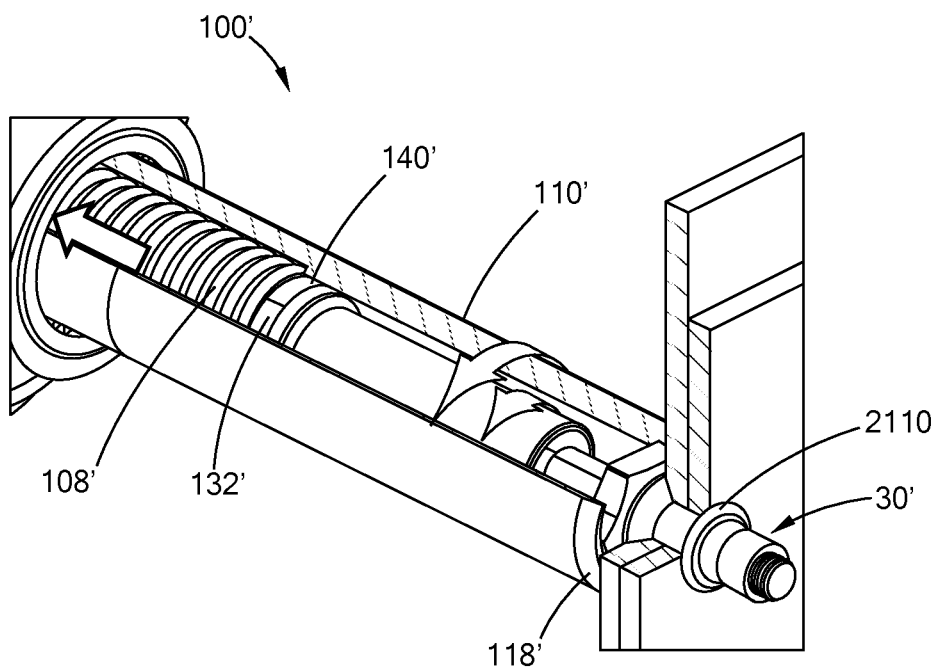
FIG. 25 is a perspective cutaway view of the tool of FIG. 17, illustrating the tool in the first operating mode and engaged with the blind fastener of FIG. 17.

Referring to FIG. 25, once the first handling portion 1710 is broken off, the tool 100' can be retracted. The first spring 108' biases the external sleeve 110' until in the first position so that the stationary nut 106' is disengaged from the exterior sleeve 110' and the driving hex 134' of the collet 116' engages the second socket 140' of the external sleeve 110' so that the collet 116' and the external sleeve 110' rotate together. In this position, the nose 118' is still engaged with the second handling portion 1726. Thus, the collet 116' rotates the exterior sleeve 110' further until a torque applied to the second handling portion 1726 of the nut 5' exceeds the second threshold torque to break off the second handling portion 1726 from the nut head 1730.

After the second handling portion 1726 is broken off, the tool 100' is retracted further and the second spring 112' pushes the stem ejector 114' forward in the collet 116' so that the stem ejector 114' ejects the first and second handling portions 1710 and 1726 from the tool 100'.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A tool for installing a blind fastener including a core bolt and a core nut, the tool comprising:
    a driving member;
    a collet driven by the driving member for engaging the core bolt; and
    an external sleeve for holding the core nut and preventing the core nut from rotating during installation of the blind fastener, the external sleeve being movable between a first position in which the external sleeve is driven by the collet to rotate with the collet and a second position in which the external sleeve is stationary despite rotating action of the collet.

2. The tool according to claim 1, further comprising a nutrunner, the driving member being a part of the nutrunner.

3. The tool according to claim 1, wherein the external sleeve includes a first socket and a second socket.

4. The tool according to claim 3, further comprising a stationary nut, wherein the second socket of the external sleeve engages the collet when the external sleeve is in the first position, the first socket of the external sleeve engages the stationary nut when the external sleeve is in the second position.

5. A tool for installing a blind fastener including a core bolt and a core nut, the tool comprising:
- a driving member;
- a collet driven by the driving member and configured to engage the core bolt to rotate the core bolt about an axis; and
- a sleeve configured to engage the core nut, the sleeve being movable between a first position in which the sleeve is driven by the collet to rotate with the collet about the axis and a second position in which the sleeve is rotationally stationary despite rotating action of the collet.

6. The tool according to claim 5, further comprising a nutrunner, the driving member being a part of the nutrunner.

7. The tool according to claim 5, wherein the sleeve includes a first sleeve feature and a second sleeve feature, wherein when the sleeve is in the first position, the first sleeve feature engages a mating collet feature on the collet to couple the sleeve to the collet for common rotation about the axis, wherein when the sleeve is in the second position, the second sleeve feature engages a rotationally stationary feature to inhibit rotation of the sleeve about the axis and the first sleeve feature is disengaged from the mating collet feature to permit rotation of the collet relative to the sleeve.

8. The tool according to claim 7, wherein the mating collet feature has a predefined shape and the first sleeve feature is a first socket configured to engage the predefined shape.

9. The tool according to claim 8, wherein the stationary feature is a stationary nut and the second sleeve feature is a second socket.

10. The tool according to claim 8, wherein the second sleeve feature includes a plurality of first lugs.

11. The tool according to claim 10, wherein the stationary feature includes a plurality of second lugs that engage the first lugs when the sleeve is in the second position.

12. The tool according to claim 8, wherein the mating collet feature defines a plurality of ramps configured to aid engagement of the first socket with the predefined shape of the collet feature.

13. The tool according to claim 12, wherein the ramps are helical ramps.

14. The tool according to claim 7, wherein the sleeve defines a socket configured to receive the core nut therein and to hold the core nut rotationally stationary relative to the sleeve.

15. The tool according to claim 5, further comprising a first spring axially biasing the sleeve toward the second position.

16. The tool according to claim 5, further comprising a stem ejector configured to eject at least a portion of the blind fastener from the tool.

17. A method of installing a blind fastener including a bolt and a nut, the method comprising:
- positioning a tool in a first position wherein a collet of the tool engages a handling portion of the bolt and a sleeve of the tool engages a handling portion of the nut, wherein in the first position the collet is rotatable relative to the sleeve;
- rotating the collet relative to the sleeve to rotate the bolt relative to the nut until the handling portion of the bolt breaks off;
- moving the tool to a second position wherein the sleeve remains engaged with the nut, wherein in the second position the collet is coupled to the sleeve to rotate the sleeve; and
- rotating the collet to rotate the sleeve until the handling portion of the nut breaks off.

18. The method according to claim 17, further comprising retracting the tool and ejecting the handling portions of the bolt and nut from the tool.

19. The method according to claim 17, wherein when in the first position, the sleeve is rotationally stationary.

20. The method according to claim 17, wherein moving the tool from the first position to the second position includes moving the tool axially.

* * * * *